UNITED STATES PATENT OFFICE 1,990,842

CONDENSATION PRODUCT OF THE ANTHRAQUINONE SERIES AND PROCESS OF MAKING SAME

Heinz Scheyer, Frankfort-on-the-Main, Germany, assignor to General Aniline Works, Inc., New York, N. Y., a corporation of Delaware No Drawing. Original application September 21, 1931, Serial No. 564,157. Divided and this application August 8, 1933, Serial No. 684,288. In Germany October 18, 1930

5 Claims. (Cl. 260—57)

The present application is a division of my application Serial No. 564,157 filed September 21, 1931 and relating to a process for producing condensation products of the anthraquinone series.

The present invention relates to new condensation products of the anthraquinone series and a process of making same.

I have found a new process for producing condensation products of the anthraquinone series, which consists in heating methyleneanthrone of the probable formula:

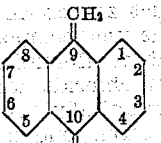

(see K. H. Meyer, Liebigs Annalen, vol. 420, page 135) or its substitution products containing in one of the 1 to 8 positions a monovalent substituent, such a halogen, an alkyl-, aryl-, acylamino- or sulfonic acid group, with an acid condensing agent, such as aluminium chloride, at temperatures below 200° C. with or without the addition of a diluent and heating the condensation products thus obtained, corresponding with the probably formula:

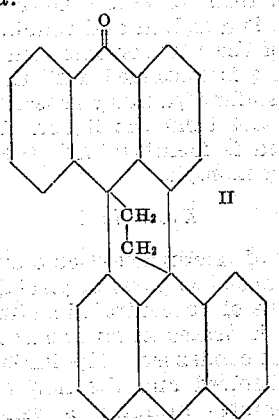

wherein the anthraquinone radicles may contain a monovalent substituent of the aforesaid kind. At temperatures above 200° C., advantageously with the addition of a suitable diluent, solvent or fluxing material, the products of the general Formula II are transformed into final products.

The final products corresponding to the probable formula:

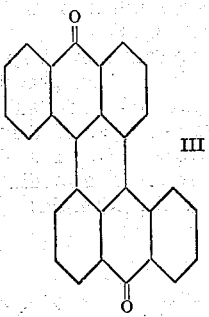

wherein the anthraquinone radicles may contain a monovalent substituent of the aforesaid kind, are fully colored products which are soluble in the alkaline hydrosulfite vat and dye cotton therefrom fast shades. The fundamental body of this series itself is apparently identical with the 5.6.11.12-dibenzoperylenequinone-4.10 described in French Patent No. 601,856, dated 16th July 1925, and signified by the formula X on page 2 of the specification.

The assumption of the aforesaid formulae is supported by the fact that in the second step of reaction the evolution of ethylene gas can be detected. By this course of the reaction the present process differs substantially from the condensation reaction of such derivatives of methyleneanthrone, in which one or both hydrogen atoms of the meso-standing methylene group are replaced by a phenylradicle. Whereas these products according to German Patents Nos. 451,907 and 454,945 enter an intramolecular condensation reaction in the present case apparently two molecules of methyleneanthrone are combined.

The second step of the reaction is carried out by heating the primary reaction products corresponding probably with the aforesaid formula II at temperatures above 200° C., i. e. above their melting point. As examples of suitable diluents, solvents or fluxing materials, which may be added, may be mentioned ethylcarbazole, β-naphthol, caustic alkalies, sulphuric acid and aluminium-chloride.

When using caustic alkalies, the final condensation products are partly isolated in the form of their water-soluble leuco compounds which may be transformed into the condensation products themselves in the customary manner, for instance by blowing in air, or by treatment with an alkaline solution containing active chlorine or hydrogen peroxide.

When using sulfuric acid, by simultaneous sulfonation the corresponding sulfonic acid derivatives may be obtained which may be used as acid wool dyestuffs.

When using aluminium chloride as condensing agent, it is not necessary to isolate the intermediates of Formula II, by increasing the temperature of the aluminium chloride fusion above 200° the final products are directly obtainable by starting from methyleneanthrone and its substitution products.

In order to isolate the intermediates of Formula II the temperature of the aluminium chloride fusion, which may be carried out by adding a suitable diluent, such as sodium chloride, is to be held between about 100 to 200°. The products corresponding to Formula II are new compounds, they are nearly colorless and are soluble in concentrated sulfuric acid with a yellowish color, they are insoluble in alkalies, they melt above 200° C. under decomposition, while forming the products of Formula III.

When carrying out the first step of the reaction under mild conditions, i. e. practically by heating methylene-anthrone or its substitution products of the above described kind in an acidic medium at temperatures below 100° C., it is possible to isolate a precedent intermediate, corresponding presumably to the formula:

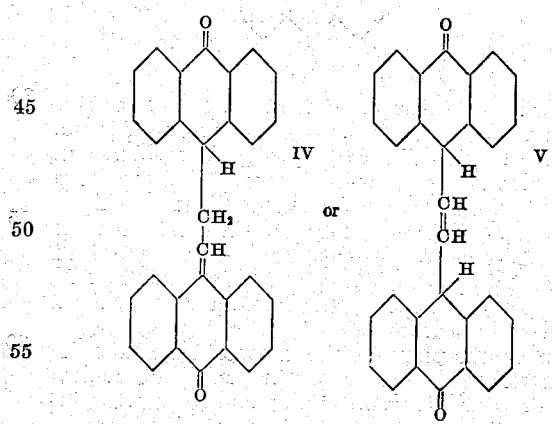

wherein the anthraquinone radicles may contain a monovalent substituent of the above described type. These intermediates are likewise new compounds, they are intense yellow colored and differ from the products of Formula II by the fact that they dissolve in alcoholic aqueous alkalies with a yellowish red color.

In order to interrupt the series of condensation reactions at this first step one may heat methylene-anthrone and its substitution products with addition of, for instance, alcoholic hydrochloric, sulfuric acid or formic acid at temperatures below 100° C.

By heating these new products with anhydrous halides, such as aluminium chlorides, at temperatures between about 100 to 200° C., the products of Formula II, by increasing the temperature above 200° C., directly the final products of the Formula III are obtained.

In order to further illustrate my invention the following examples are given, the parts being by weight and all temperatures in centigrade degrees. But I wish it to be understood that I am not limited to the particular conditions or specific products mentioned therein.

*Example 1*

A mixture of 10 parts of methyleneanthrone, about 100 parts of methanol and about 10 parts of concentrated hydrochloric acid is boiled for some time in an apparatus provided with a reflux condenser. Almost immediately the coloration of the liquid turns to yellow and a yellowish, well crystallized, precipitate is formed. If a test of the precipitate, dissolved in sulfuric acid, no longer shows the intense green fluorescence of methyleneanthrone, the formed precipitate is separated while hot from the liquor. The new product apparently corresponding with the Formula IV or V dissolves in concentrated sulfuric acid with a yellow, in an aqueous alcoholic caustic alkali solution with a yellowish red color. The raw product melts at about 240° C. By shortly thereafter extracting it with glacial acetic acid the new compound may be purified. The purified product melts at about 254° C. The same product is obtained when heating a mixture of 10 parts of methyleneanthrone, about 200 parts of methanol and 30 parts of concentrated sulfuric acid for about 3 hours in an apparatus provided with a reflux condenser and isolating the product as described above.

When heating the new compound with about the tenfold amount of aluminiumchloride with addition of sodium chloride while stirring at about 140° C., substantially the further intermediate is formed, corresponding to Formula II. When increasing the temperature of the aluminiumchloride fusion above 200° C. or when continuing the heating at temperatures below 200° C. for a long time, immediately in the main the dyestuff of Formula III is formed.

*Example 2*

10 parts of methyleneanthrone are mixed with about 50 parts of formic acid and the mixture is slowly heated to boiling. While the coloration of the liquor turns to yellow slowly the methyleneanthrone is dissolved and simultaneously the separation of the new condensation product begins. Heating is continued until the precipitate shows a crystalline granular aspect. It is separated while hot from the liquor. The product thus obtained is identical with the product of the foregoing example.

*Example 3*

10 parts of methylene-2-chloranthrone are mixed with about 50 parts of glacial acetic acid and 12.5 parts of concentrated sulfuric acid and the mixture is heated in an apparatus provided with a reflux condenser. The initial product is gradually dissolved and the new condensation product separates in form of yellow crystals, which are separated from the liquor and washed out. The new product dissolves in concentrated sulfuric acid with an orange-yellow, in an aqueous alcoholic caustic alkali solution with a yellowish red color. The raw product melts at about 284° C. The new product corresponds probably with the formula:

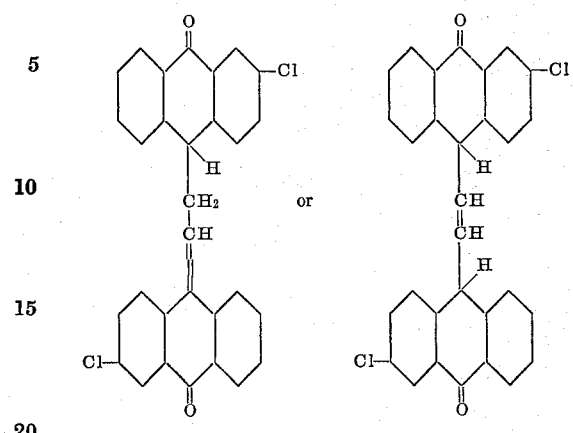

I claim:

1. A process for producing condensation products of the anthraquinone series which comprises heating a 9-methylene-anthrone compound of the formula:

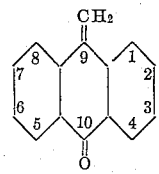

wherein in one of the 1 to 8 positions a monovalent substituent selected from the class consisting of halogen, an alkyl-, aryl-, acylamino- and sulfonic acid group, may be present, with an acid condensing agent at temperatures below about 100° C.

2. A process for producing condensation products of the anthraquinone series which comprises heating a 9-methylene-anthrone compound of the formula:

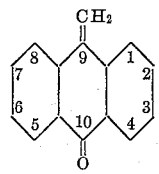

wherein in the 2 position halogen may be present, with an acid selected from the group consisting of alcoholic hydrochloric and sulfuric acid and formic acid at temperatures below about 100° C.

3. Bimolecular condensation products of methylene-anthrone, corresponding with the formula:

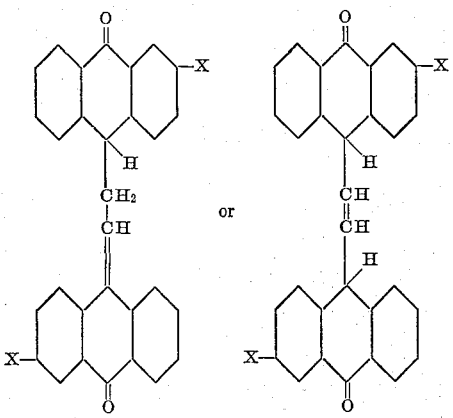

in which the X's mean hydrogen or halogen, which products represent intense yellow colored crystalline substances, melting above 200° C. and being soluble in sulfuric acid with a yellowish, in aqueous alcoholic caustic alkalies solutions with a yellowish red coloration.

4. The bimolecular condensation product of methylene anthrone, corresponding with the formula:

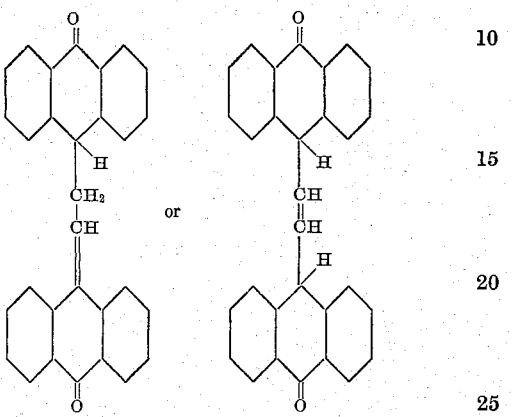

which product dissolves in concentrated sulfuric acid with a yellow, in an aqueous alcoholic caustic alkali solution with a yellowish red color, melting in a pure state at about 254° C.

5. The bimolecular condensation product of 2-chloro methylene anthrone, corresponding with the formula:

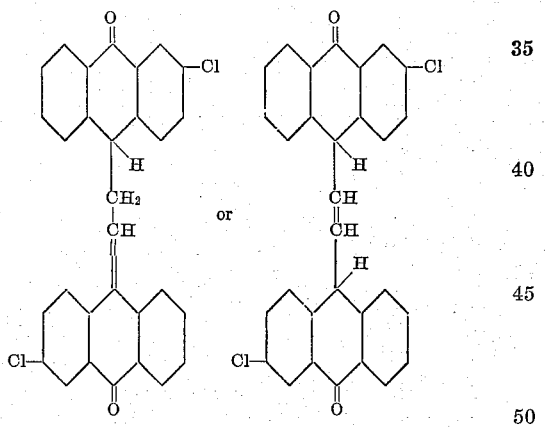

which dissolves in concentrated sulfuric acid with an orange-yellow, in an aqueous alcoholic caustic alkali solution with a yellowish red color, melting at about 284° C.

HEINZ SCHEYER.